June 2, 1970          B. RUDLOFF          3,515,609

METHOD OF MANUFACTURE OF REINFORCED UNWOVEN FELTS

Filed March 1, 1966          2 Sheets-Sheet 1

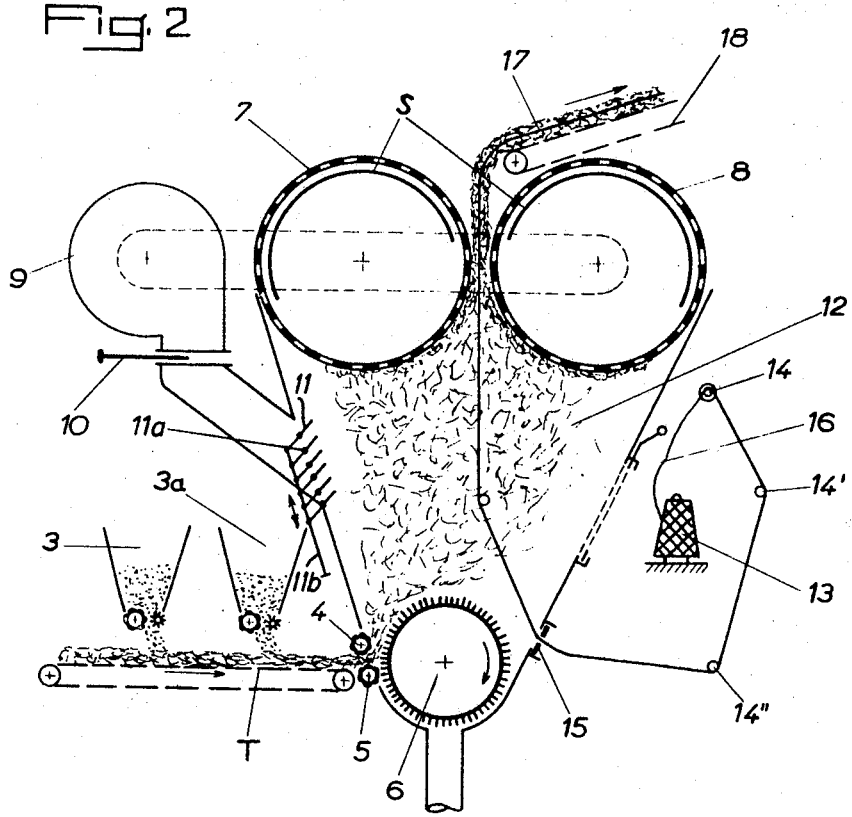

United States Patent Office 3,515,609
Patented June 2, 1970

3,515,609
METHOD OF MANUFACTURE OF REINFORCED UNWOVEN FELTS
Bernard Rudloff, Marckolsheim, Bas-Rhin, France
Filed Mar. 1, 1966, Ser. No. 530,914
Claims priority, application France, Sept. 27, 1965, 8,422
Int. Cl. B32b 5/28; D04h 1/60
U.S. Cl. 156—62.8                     1 Claim

ABSTRACT OF THE DISCLOSURE

A process for the manufacture of reinforced, unwoven felts, with or without fillers, which comprises the steps of incorporating regularly spaced in the texture of the sheet of unwoven felt an intimate mixture of textile fibers and resins and fillers in a chamber under negative pressure, causing passage of the mixture between two perforated drums creating the suction which entrains the mixture of threads of a material selected from the group consisting of twisted or cabled cotton, flax, jute, hemp or ramie, or metal wires having an individual dynamometric resistance to traction, with the purpose of imparting the desired breakage resistance to the entire reinforced sheet thus formed after passage between the perforated drums, the reinforced unwoven felts being capable of supporting considerable tractions.

---

Figure 1:
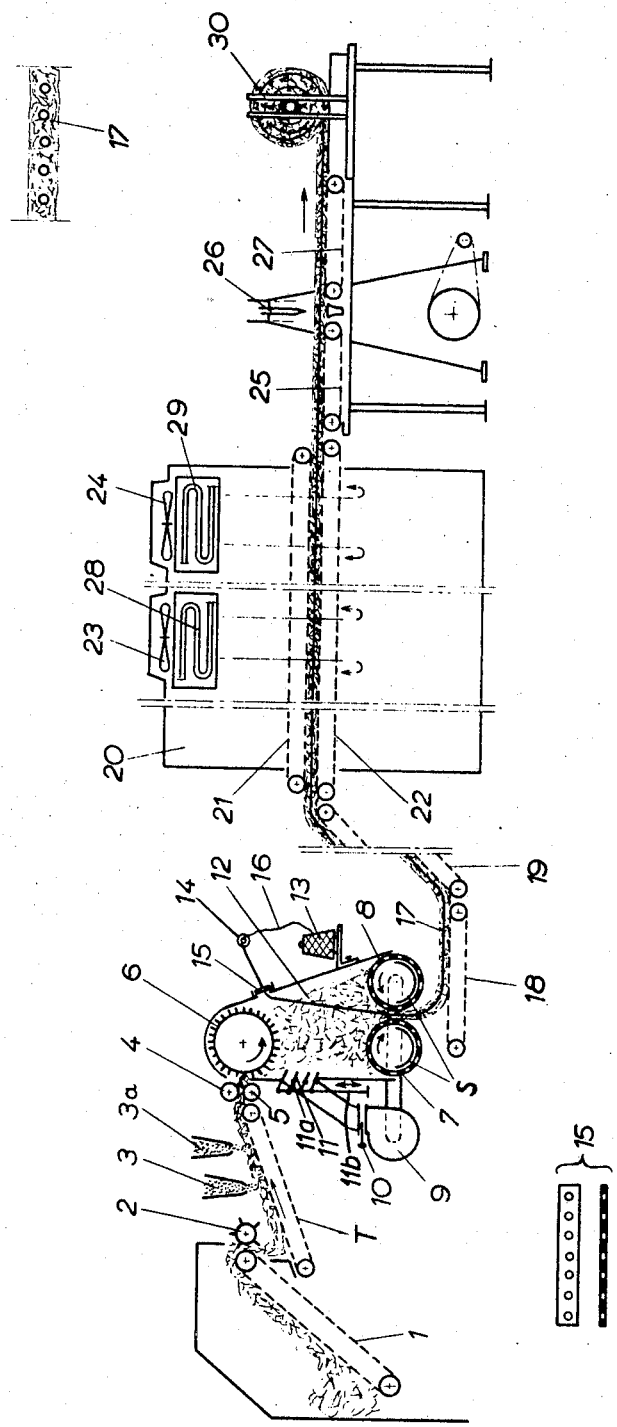

The present invention relates to the continuous manufacture of reinforced, unwoven felts, with or without charges.

Unwoven felts known at present, in all their forms and constitutions, have a relatively slight dynamometric resistance to traction, whatever their thickness is or whatever their weight is per unit of area. This dynamometric resistance is in any case much lower than that of a fabric woven with the conventional warp and weft.

While the utilization of these unwoven felts is greatly varied, it is very frequently limited by the lack of tensile strength.

This weakness is very irksome in many cases, and prevents the use of unwoven felts when these products would be the only ones to supply the true solution.

The present invention has the object of remedying this defect and if imparting to the unwoven felt a sufficient tensile strength for the use for which it is intended, so that the possibilities of utilization of these products may be increased considerably and they may be reconsidered.

This novelty in the sphere of unwoven felts can also open up a multitude of possibilities of treatment of the reinforced unwoven felts which can in fact, by reason of their reinforcement, support considerable tractions and be treated like the conventional fabrics in calendering, impregnation, proofing or other installations.

Moreover the present device for the manufacture of reinforced, unwoven felts premits the continuous manufacture, in mass production, of articles of various densities and thicknesses, it being possible for the reinforced unwoven felts produced according to this process to have densities from 20 to 150 kg/sq.m. and thickness of 8 to 100 mm. and above.

The present invention consists in the incorporation in the texture of the unwoven sheet, before its formation, of regularly spaced threads or strands, which are selected in such manner that their individual dynamometric resistance tensile strength imparts the breakage resistance which is desired to the entire sheet. These threads can be of different natures, such as twisted or cabled cotton, flax, jute, hemp, ramie or any other natural, artificial, synthetic or mineral fiber, it also being possible for metal wires to be used.

The invention will be further explained hereinafter with reference to an installation for the continuous manufacture of reinforced unwoven felts according to the invention.

With these and other objects in view, which will become apparent in the following detailed description, the present invention will be clearly understood in connection with the accompanying drawing, in which:

FIG. 1 is a diagrammatic elevational view of the elements, which carry out the various successive operations; and FIG. 2 is an elevation of a detail of another embodiment.

Referring now to the drawing, in FIG. 1 the textile fibres of any nature and length, in flock or ravelled form, arrive pneumatically or by any other system in a reserve tank of an automatic charging device. The conveyor apron 1 brings them on to the feed table T by means of the beater cylinder 2, which detaches them from the apron 1. Above the feed table T a distributor 3 for powdered resins controls the quantity, regularly and as desired, of the binders serving for agglomeration. The channelled feed cylinders 4 and 5 feed the fibers, sprinkled with finely powdered resins, to the wheel 6, which is equipped with metal points and rotates downwards as indicated by the rotation arrow. In a chamber 12, which is kept under regulable sub-atmospheric pressure by a ventilation system 9 and a valve 10, the fibers are mixed intimately with the very fine powdered resins ($4/1000$) which surround them. Turbulence to favor and perfect this mixing is controlled by the guide elements 11, which are pivotal about pivot axes 11a, the direction of which guide elements is orientable by control lever 11b.

The fibers thus mixed and coated with resins are sucked by the surfaces of the perforated drum 7 and 8; forming layers thereon; these drums are closed by the segments S. At the same time, and by means of the devices 13, 16, 14, 15, filaments, i.e., threads or strands are introduced into the chamber 12 and between the perforated drums 7 and 8, as shown in FIG. 1, and thus are incorporated intimately in the sheet which is formed at the exit from the drums 7 and 8 by the latter pressing together the layers formed on the surfaces of each drum.

The entraining of the introduced threads or strands is effected by the drawing action of the drums 7 and 8, on both layers, between which they are compressed in passing. Then the sheet 17 reinforced by the incorporated threads or strands is transported by the endless belts 18 and 19 into a polymerization tunnel.

For each thread or strand, a tension device is mounted at 14 before their entry into the perforated guide 15, to keep these threads or strands under slight tension in the chamber 12, where the coating of the fibers with the powdered resins is effected by means of the turbulence.

The guide 15 is interchangeable and permits the introduction and passage of a different number of threads or strands over the total width, according to whether the guide is more or less perforated. In general the introduction of one thread or strand every fifty centimeters is sufficient; this interval can be increased or reduced, and equally the threads or strands can be of different diameters or sizes and can be introduced at will into the desired part of the width of the sheet to be formed.

By reason of the reinforcement thus given to the unwoven felts, the latter may contain large amounts of powdered mineral fillers of heavy density and specific weight, such as barium sulphate, rock powder or asbestos, or with calibrated light products in grains, such as corks, polyester or polyurethane foams in cured form, or wood sawdust.

These additions are effected by means of the quantity-regulating device 3a provided for this purpose, which distributes these various products over the layer of fibers in passing.

The charges incorporated in the fibers are generally of very different specific weights from one another initially and especially in relation to the fibers. In order to permit their intimate mixing and above all homogeneous distribution with the fibers, the sedimentation over the perforated drums 7 and 8 can be corrected or adjusted at will with the guide elements 11 provided for this purpose.

Thus it is seen that the specific weights of the articles produced can be regulated at will and go beyond 200 kg./sq. m.

However in the case of certain applications, and according to the sedimentation of the resins utilized and of the additional charges selected with the proposed textile fibres, the correction or adjustment with the aid of the guide members 11 provided for this purpose can be effected preferably by the reversal of the direction of suction produced in the intimate-mixing chamber by turbulence by the two perforated drums 7 and 8. In this case it is advantageous to invert the device according to FIG. 1, in which the suction is effected from the top downwards, so as to provide a suction from the bottom upwards, as shown in FIG. 2.

As shown in FIG. 2, the feed table T is disposed horizontally to receive the fibers which, after reception of the resins and of the additional charges or fillers from the quantity-regulating distributors 3 and 3a, respectively, are presented by the cylinders 4 and 5 to the wheel 6, which is equipped with metallic points and rotates in the direction of the arrow, and is disposed in the lower part of the inverted chamber 12, whereas the perforated drums 7 and 8 are mounted in the upper part of the inverted chamber 12.

The threads or strands are then introduced, being unwound from the bobbin 13 and passing over the rollers 14, 14′ and 14″, to 15, that is to say to the bottom of the chamber 12, by way of the perforated guide, and they pass through the chamber from the bottom upwards in order to be incorporated in the fibers intimately mixed with the resins and charges, under the action of the upward suction, between the perforated drums.

However, whether in the installation the chamber 12 is mounted according to FIG. 1 for downward suction or according to FIG. 2 for upward suction, the sheet 17, whether or not charged, reinforced with internally incorporated threads or strands, is conducted by the conveyor belts 18 and 19 into a high-temperature baking tunnel 20, where by reason of a closed-circuit forced-air ventilation system, it is polymerized by the passage of hot air, with an air current passing from above downwards or from below upwards, or alternately in both directions. This is effected by means of the turbines 23 and 24 placed above the heating units 28 and 29.

At the entry of the polymerization tunnel, the sheet 17 is taken between two conveyor belts 21 and 22. The upper belt is adjustable in height to permit the compression of the resin-coated fibers during baking, and better adhesion between the fibers under the action of the polymerization caused by the heat passing through the sheet 17 from one side to the other. The adjustment of the upper conveyor belt thus permits of varying the space between the belts, which consequently gives the possibility of compressing the treated sheet to a certain height or thickness. Thus it is possible to vary the flexibility of a product of the same weight per unit of area, by compressing it more or less before and during baking, and also by adding more or less resins with the distributor device.

The conveyor belts can be of the link type or can be constituted by struts of perforated sheet metal mounted on lateral chains.

At the exit from the polymerization tunnel, the charged or uncharged, reinforced, unwoven felt is brought on the tables 25 and 27 of a guillotine and cut possibly into panels, by the blade 26. Thin products, of ten to fifteen millimeters, can equally be wound by the device 30.

I claim:
1. A process for the manufacture of reinforced, unwoven felts, comprising the steps of
    forming a substantially uniformly intimate mixture of textile fibers and resins and fillers in a chamber under subatmospheric pressure, and
    causing passage of said mixture between two oppositely rotating perforated drums by maintaining said drums under a pressure less than the pressure in said chamber thereby creating a pressure difference which entrains said mixture causing a layer of said mixture to form on the surface of each drum and both of said layers on each drum together being compressed into a sheet and drawn by and between said two drums, and simultaneously introducing into said chamber a plurality of continuous filaments spaced parallel to said sheet, said filaments being guided within said chamber to between said two drums and compressed and drawn under tension by and between both of said layers constituting said sheet, said filaments having an individual dynamometric tensile strength for imparting the desired breakage resistance to the entire reinforced sheet thus formed after passage between said perforated drums, the reinforced unwoven felts having a substantial tensile strength.

References Cited

UNITED STATES PATENTS

| | | | |
|---|---|---|---|
| 2,543,101 | 2/1951 | Francis | 156—62.2 |
| 2,897,874 | 8/1959 | Stalego et al. | 156—62.8 |
| 3,050,427 | 8/1962 | Slayter et al. | 156—377 |
| 2,308,849 | 1/1943 | Young | 156—372 |
| 2,409,951 | 10/1946 | Nootens | 156—62.2 |
| 2,437,689 | 3/1948 | Francis | 156—62.2 |
| 2,927,623 | 3/1960 | Huisman et al. | 156—436 |
| 3,356,780 | 12/1967 | Cole | 156—373 |

OTHER REFERENCES

Nauth, Raymond: The Chemistry and Technology of Plastics, Rheinhold Pub. Co., New York, pp. 39, 40.

JOHN T. GOOLKASIAN, Primary Examiner

W. E. HOAG, Assistant Examiner

U.S. Cl. X.R.

156—377; 161—156; 264—113